United States Patent [19]

Larson

[11] Patent Number: 4,461,356

[45] Date of Patent: Jul. 24, 1984

[54] PLANTING IMPLEMENT WITH END SEGMENTS REARWARDLY PIVOTAL TO FORM QUADRILATERAL STRUCTURE

[76] Inventor: Gary A. Larson, R.R. 3, Box 150, Canby, Minn. 56220

[21] Appl. No.: 355,912

[22] Filed: Mar. 8, 1982

[51] Int. Cl.$^3$ ............................................. A01B 65/02
[52] U.S. Cl. .................................... 172/311; 111/57; 172/651; 172/689
[58] Field of Search ............... 172/311, 456, 662, 776, 172/689, 688, 651; 56/228, 385; 280/411 R, 411 A, 412, 413, 656; 111/57

[56] References Cited

U.S. PATENT DOCUMENTS

| | | | |
|---|---|---|---|
| 2,658,770 | 11/1953 | Koenig | 280/412 |
| 3,436,098 | 4/1969 | Orendorff et al. | 111/57 X |
| 3,542,138 | 11/1970 | Fackler et al. | 172/311 X |

*Primary Examiner*—Richard T. Stouffer
*Assistant Examiner*—William H. Honaker
*Attorney, Agent, or Firm*—Schroeder, Siegfried, Vidas & Arrett

[57] ABSTRACT

A planting implement which includes an elongated support beam for carrying a plurality of spaced planting units thereon. The support beam also includes a plurality of rearwardly pivotable segments arranged so that a closed framework structure may be constructed by pivoting and interconnecting the rearwardly pivotal segments. The closed framework structure includes a forward side containing a portion of the planting units and a generally parallel, rearward side containing the remaining planting units. The spacing of the rearward side planting units is offset from that of the forward side units, approximately one-half of the distance of the planting units. This results in equally spaced rows of approximately one-half the distance between the planting units.

6 Claims, 6 Drawing Figures

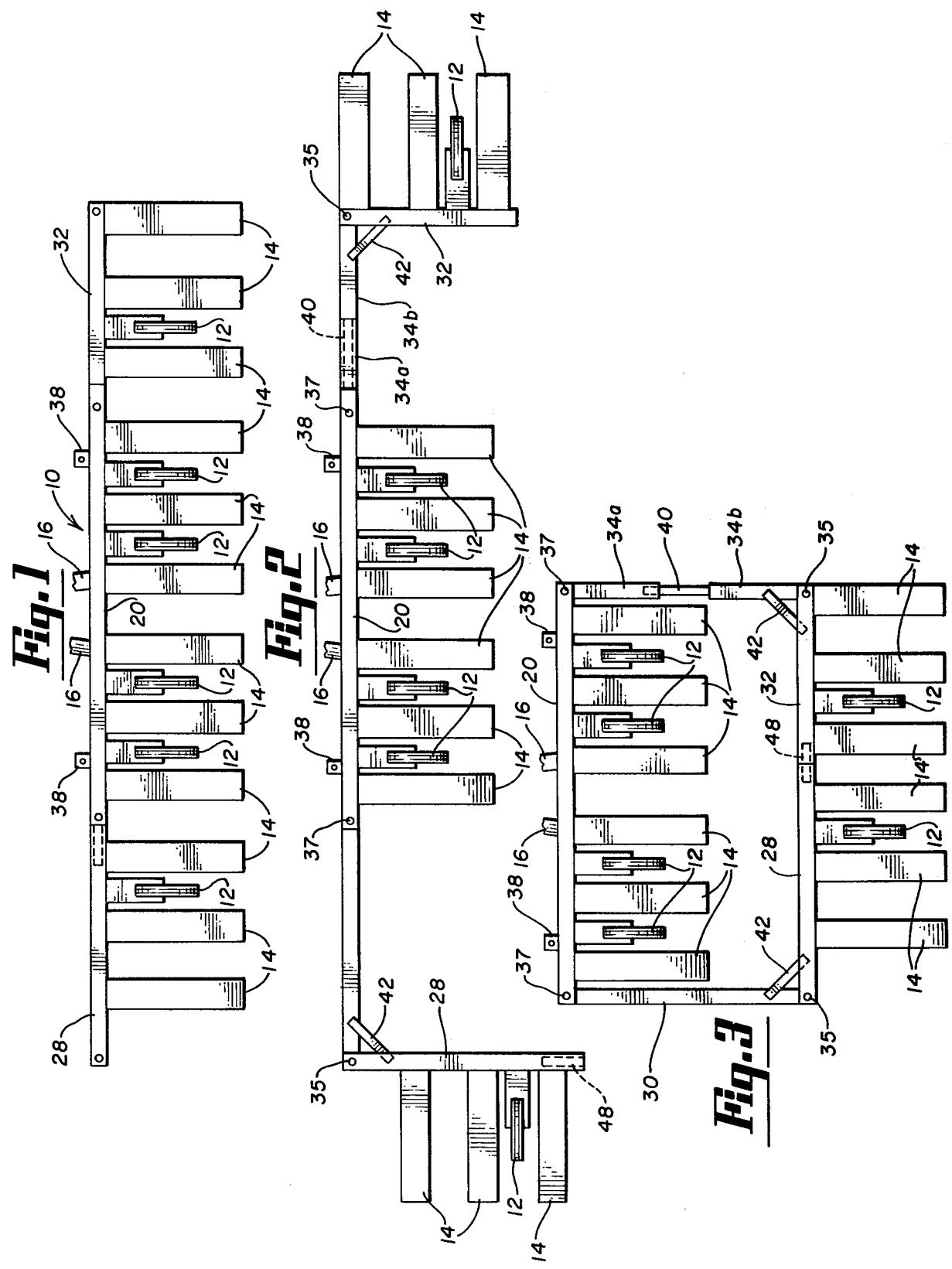

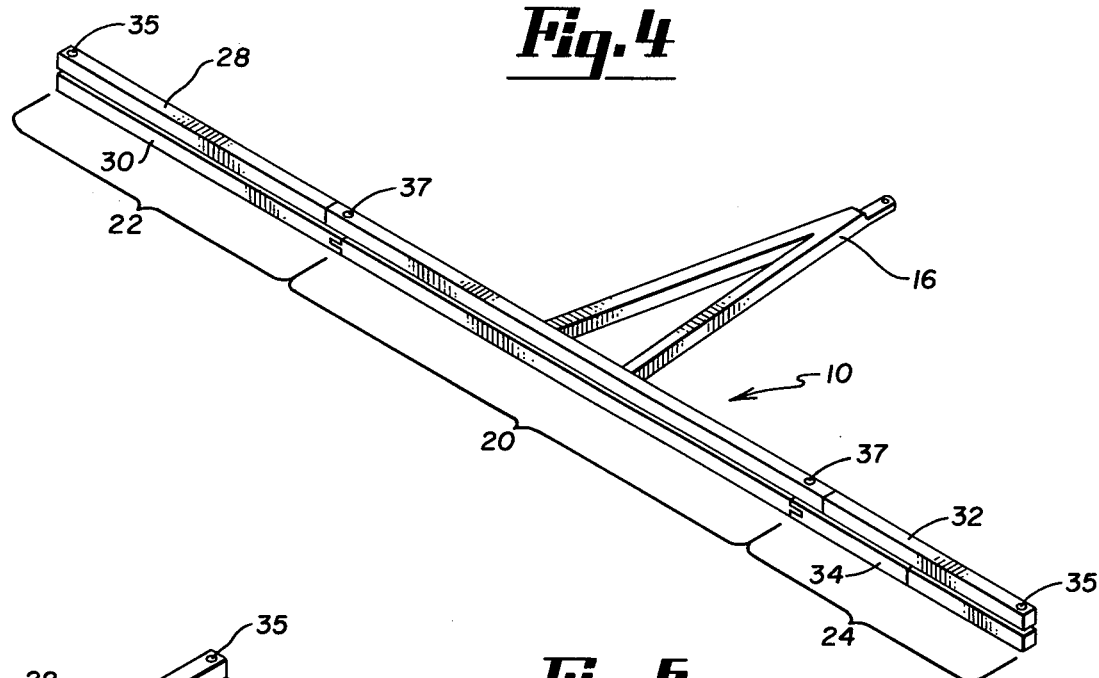
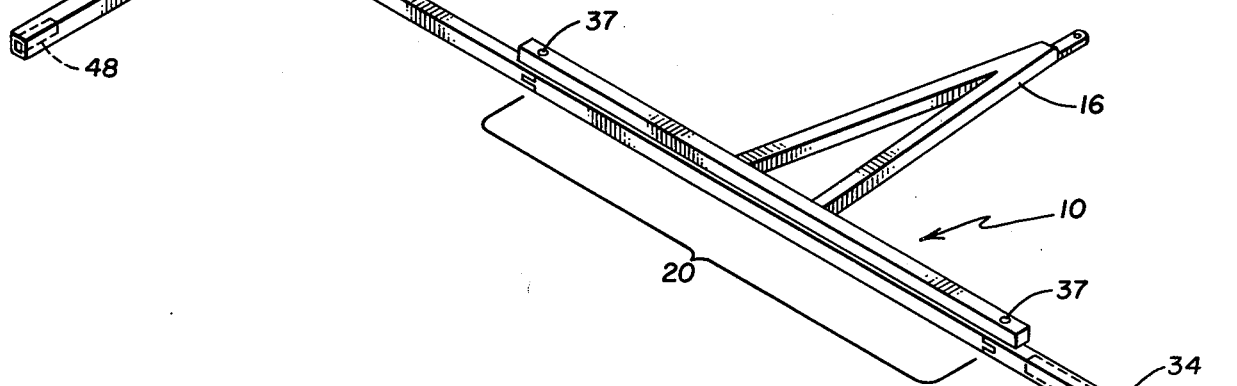
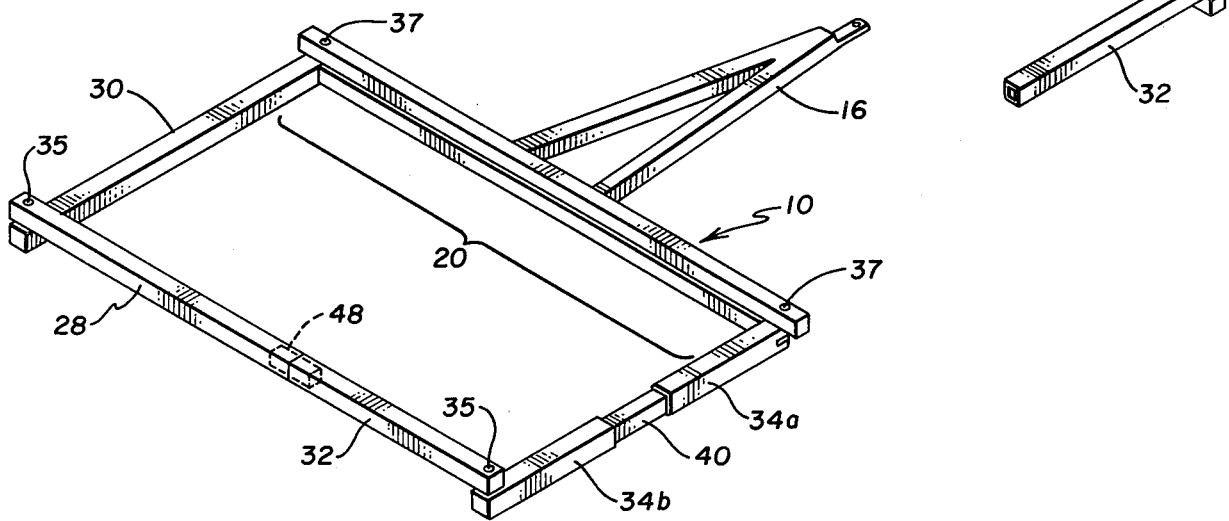

PLANTING IMPLEMENT WITH END SEGMENTS REARWARDLY PIVOTAL TO FORM QUADRILATERAL STRUCTURE

BACKGROUND OF THE INVENTION

This invention relates to a dual purpose agricultural planting implement and in particular to an implement for planting both conventionally spaced corn rows and narrow soybean rows of about one-half the corn row spacing.

Soybeans are typically planted by implements also used to plant corn. It has been found, however, that planting soybeans in narrower rows than conventional corn row spacing, provides an effective method of increasing soybean production. On-farm and university testing throughout the cornbelt region of the United States have evidenced significant yield gains with narrow rows. An initial significant move reduced soybean rows from a 40" spacing to a 30" spacing resulting in a 10–25% increase in yield. This was usually accomplished by modifying the spacing of planting units on a planter implement so that corn would also be planted in 30" rows. No change in corn yield resulted from this spacing reduction. However, more recently, studies have shown that still narrower soybeans rows will further increase yields. It now appears that the optimum row spacing for soybeans is in the range of 10–20". 15" rows have been found to give approximately a 15% yield over 30" rows except in some southern states where rows less than 15" provided even better yields.

A variety of methods of planting narrow rows of soybeans have been tried. Solid-seeding produces good yield increases but the technique has several drawbacks. For instance, weed control is a problem. Cultivation is not possible and a good weed management program is needed. This in turn requires heavy use of chemicals and a good past weed history on the field. Additionally, grain drills which are used for solid seeding have not produced very satisfactory depth control, seed placement or good seed/soil contact. A still further drawback occurs with some soils which need a cultivation which break the crust and allow areation of the soil. This is not possible with solid seeding.

There are several types of narrow-row soybean planters presently in use. The most prevalent manner of either solid seeding (6-7" rows) or very narrow row seeding (10-12") has been to plug metering holes in grain drills. A few home-made rigs have been made by farmers around the country, usually using older type planters. Commercially, there are now available specialty planters to plant just narrow row soybeans. Conventional wide-row "convertible" planters have also become available commercially to which additional planting units can be added to obtain narrow rows.

Soybeans require good planting management especially in drier areas where spring-time moisture, specifically in the upper soil layer, is short. There must be consistent depth control, accurate seed placement and good soil/seed contact. As already pointed out, conventional grain drills are not very accurate or reliable in any of these areas. Additionally, most soybeans are grown in the cornbelt region of the United States where many farmers do not own a grain drill and cannot afford to purchase one just merely to experiment with a new soybean planting technique. Finally, the use of a drill for seeding either solid or very narrow rows, eliminates the option of cultivating and thus, puts the heavy burden of weed control upon the use of chemicals whose control depends on weather, proper timing, proper use and longevity of controls and prior field conditions. Without the option of cultivation, many producers would be forced to use expensive and sometimes ineffectual weed control.

Commercial planting units work well but are often too expensive for most farmers to afford. This is especially true for the speciality type planters which can only be used for soybeans and therefore, require the purchase of two different row planters for the typical farmer who plants both corn and soybeans. The convertible type of commercial planter, to which the extra units required can be added when needed, or left off when not needed, eliminates the requirement for purchasing two planters but can still be very expensive. The most basic planter row units, without herbicide or insecticide capability presently cost around $1000–$1200 per row. Such convertible units therefore still require a very large investment, especially for the producer who wishes to experiment for a few years with narrow-row planting to see how it suits his operation and to develop his technique. Convertible planters also require time to switch back and forth which can be very expensive during the prime planting time and cause inconvenience when filling or working on the main unit.

Typical conventional corn/soybean planters have a capability for adding herbicides during planting. However, neither the commercially available specialty narrow row soybean planters nor the existing units on commercial convertible type planters provide such herbicide capability.

DESCRIPTION OF THE INVENTION

The present invention is a dual purpose planting implement which permits the use of conventional wide-row planting of corn and narrow-row soybean planting with the same basic unit and with only a relatively minimal additional production cost over that of conventional wide-row planters. The implement is especially attractive to producers who may wish to experiment with narrow row soybeans without committing large sums of money to the experiment. The inventive design allows the use of various types of planting units according to the individual farmer's preference and local planting conditions.

As with conventional planting implements, the inventive structure includes an elongated support beam means for carrying a plurality of spaced planting units thereon. However, the support beam means of the present invention includes a plurality of rearwardly pivotable segments arranged so that a closed framework structure may be constructed by pivoting and interconnecting the rearwardly pivotal segments. The closed framework structure includes a forward side containing a portion of the planting units and a generally parallel, rearward side containing the remaining planting units. The spacing of the rearward side planting units is offset from that of the forward side units, approximately one-half of the distance of the planting units. This results in equally spaced rows of approximately one-half the distance between the planting units.

In the preferred embodiments, the two ends of the main support beam means fold back to form a rectangle, with the rearwardly pivotable segments connecting at the center of the rearward side so that planting units from each end of the main support member are included on the rear side of the folded back, narrow-row planter.

As with conventional planters, the elongated support member or beam means is supported by a plurality of wheels and includes a forwardly extending tongue by means of which an implement may be connected to a motive means such as a tractor. In the inventive structure, the tongue is attached to the portion of the support beam means which does not fold back. Additionally, at least one wheel is included on each segment which forms the side of the narrow row planter. In the preferred embodiment, a lift jack is included on each side, so that the ends of the implement may be raised off the ground to facilitate the folding back or forward of the support beam segments. With the lift jacks, the time for switching from the conventional wide-row to the narrow row planter is minimal, probably no more than a few minutes. This is especially beneficial in those planting seasons when weather and soil conditions necessitate the switching back and forth more than once. Since the actual planting units attached to the support structure are not changed, herbicides or insecticides can be used even during narrow-row planting, if such capability is included on the original planting units.

Although the effective planting width is reduced by one-half, when the narrow-row structure is used, this disadvantage is offset by the fact that a producer can usually plant 1¼ to 1⅝ more acres per hour when planting soybeans over corn. This is partly because of faster planting speeds and of the reduced amounts of insecticide, herbicide and fertilizer that must be handled. Additionally, soybean seed is usually loaded through the use of some type of auger and wagon box, instead of by bag.

One of the benefits of narrow-row soybean is that soybean plants tend to shade over the ground and crowd out any weeds within the first three to four weeks. Therefore, under normal conditions, cultivation should not be necessary, or should only have to be done once, compared to the two or even three times many farmers cultivate in conventional rows. This gives a substantial reduction in fuel and time needed in cultivation.

The inventive structure provides a secondary benefit in that the foldback feature provides a simple and fast way of transporting the planter without unhooking and using a trailer or towing from the end. This would be an efficient mode of transport, even when the planter is intended to be used in the field for conventional wide rows.

BRIEF DESCRIPTION OF THE DRAWINGS

FIG. 1 is a top plan view of a planting implement of the present invention in the conventional, wide-row planter mode;

FIG. 2 is a view as in FIG. 1, with end segments carrying some of the the planter units swung out and braced in an intermediate position between the wide and narrow row modes.

FIG. 3 is a view as in FIGS. 1 and 2 with the implement in the narrow row mode;

FIG. 4 is a pictorial view of the support beam of the present invention, without wheels or planting units, in the wide-row mode;

FIG. 5 is a pictorial view as in FIG. 4, with the beam in an intermediate position between the wide and narrow-row modes;

FIG. 6 is a pictorial view as in FIGS. 4 and 5 support beam in the narrow-row mode.

DETAILED DESCRIPTION OF PREFERRED EMBODIMENT

As shown in FIG. 1, the implement of the present invention in the wide-row mode has a configuration nearly identical to conventional single purpose planters. The implement has an elongated main support beam means, generally designated by the numeral 10, which is in turn, supported by a plurality of wheels 12 journaled thereto. Support beam means 10 carries a plurality of planting units 14 which may optionally include capacity for delivery of herbicide and/or pesticide during the planting operation. Support beam 10 is connected to a tongue member 16, best shown in FIGS. 4-6, which provides means for connecting the implement to motive means such as a tractor.

The support beam means of the present invention differs from a conventional planter, however, in that it comprises a plurality of pivotal segments which permit a portion of the beam to be folded back to form a closed rectangular frame which carries offset planting units on both the front and rear sides of the rectangle. This novel beam structure is best shown in FIGS. 4-6. The support beam means preferably comprises a longitudinal pair of segmented square tool bars, one above the other. The upper tool bar carries the planting units 14 and wheels 12.

Beam 10 includes a central segment 20 and two end segments 22 and 24. Each end segment includes two separately pivoted portions 28, 30 and 32, 34 respectively which are formed by the upper and lower tool bars. The upper end portions 28 and 32 are pivotably attached to the lower portions 30 and 34 at the ends thereof by pins 35 so that each may be swung rearwardly as shown in FIGS. 2 and 5, perpendicular to the main beam 10. The lower sections 30 and 34 are pivotably attached to the central segment 20 by pins 37 so that the lower sections may also be swung rearwardly, perpendicular to segment 20, to form a rectangular narrow-row structure as shown in FIGS. 3 and 6. Wheels 12 may be made pivotable to facilitate easy backward movement of the end segments.

To accomplish the folding and unfolding operations on the inventive planting implement, it is necessary to jack up first one end of the implement and then the other so that the wheels and planting implements are off the ground. Lift jacks 38 located on the central beam segment 20, permit the sequential jacking and folding or unfolding operations.

In the preferred rectangular embodiment, the support beam means extends beyond the last planter on one end segment as shown in segment 28. This is necessary to offset the planting units in the narrow-row configuration so that the rear units are offset one-half the spacing between the planting units. Since this results in segments 28 and 32 being of different length, and since the two lower end segment portions 30 and 34 must produce equal length sides for the rectangular configuration, the shorter portion 34 is divided into two subsegments, 34a and 34b with an internal telescoping tool bar segment 40 which permits equalization of the lengths of the two rectangle sides formed by portions 30 and 34. This telescoping side feature is not necessary if an odd number of planting units is utilized and a trapezoidal configuration, with the extra planter unit in the rear and equal length sides, is used.

As shown in FIGS. 3 and 4, segments 28 and 32 should each include at least one wheel 12 so that the rear side is properly supported in the narrow row configuration.

As is also shown in FIGS. 2 and 3, brace members 42 are preferably inserted between segments 28 and 30 and segments 32 and 34 when the narrow row configuration is to be used to stabilize the structure and maintain the proper angles. Brace members 42 may be adapted to fold against one segment ssection when not in use.

To stabilize the rear side support formed by beam portions 28 and 32, a square tool bar section 48 carried in beam portion 28 may be utilized. As shown in FIGS. 3 and 6, when the rectangular narrow-row configuration is used stabilizing bar 48 is slid between beam portions 28 and 32 to maintain rigidity of the rear sides formed thereby.

Any conventional means may be used to lock the beam segments together in the wide or narrow-row configurations and these means form no part of the present invention.

Whereas, the present invention has been described in detail with reference to the upper embodiment, it should be understood that many variations may be made without departing from the essential features of the invention which are set forth in the following claims.

I claim:

1. An agricultural planting implement comprising: elongated support beam means and a plurality of equally spaced seed planter units carried thereon, said support beam means being supported above the ground by a plurality of wheels journaled thereto and including a central segment, and two end segments; each of said segments carrying some of said spaced planter units thereon, hereinafter termed central segment planter units end segment planter units, respectively, each of said end segments further including first and second end segment longitudinal portions, respectively, and pivot means joining said first end segment longitudinal portions to said second end segment longitudinal portions at the outer ends thereof, whereby each of said first end segment longitudinal portions may be pivoted rearwardly from said support beam means, said first end segment longitudinal portions being adapted to carry said end segment planter units, and each of said second end segment longitudinal portions including pivot means joining the interior end thereof to said central segment whereby the second end segment longitudinal portions may be pivoted rearwardly so as to bring said first end segment longitudinal portions into contact with each other to form a quadrilateral framework structure; and connection means for rigidly connecting said first end segment longitudinal portions together to form a rear planter carrying support member behind and generally parallel to said central support member segment, the lengths of said segments arranged so as to offset the spacing by which the rear support member carries said end segment planter units from the spacing of the central segment planter units by about one half the distance between said central segment planter units when said quadrilateral structure is formed.

2. An implement as in claim 1 wherein the front and rear support member each include at least two wheels journaled thereto when the framework structure is formed.

3. An implement as in claim 1 wherein the framework structure is a rectangle, the end segments are of unequal lengths and one end segment second portion is divided into two sections and includes a telescoping intermediate section whereby the lengths of the rectangle sides may be equalized when the rectangular configuration is utilized.

4. An implement as in claim 1 wherein said connection means comprises a sliding bar carried within one of said first end segment longitudinal portions and adapted so that a portion thereof may be slid into the other of said first end segment longitudinal portions, when the two end segment longitudinal portions are brought together to form said framework structure.

5. An implement as in claim 1 further including jack means on said central beam segment for raising the ends of said support beam to facilitate the pivoting of said end segments to form or disassemble said framework structure.

6. An agricultural planting implement of the type adapted for towing behind a vehicle, the implement comprising: elongated support beam means, said support beam means being divided into a plurality of segments, namely a center segment and two segment pairs each of which is carried at an end of the center segment and each of which is comprised of upper and lower end segments, the upper and lower end segments of each of said pairs being of approximately equal length while one pair of upper and lower end segments is shorter in length than the other pair of upper and lower end segments, the upper and lower end segments of each pair being pivotally connected to each other at the inner and outer ends thereof respectively for rearward rotation of each of the upper end segments, each of said lower end segments of each pair being pivotally connected at its inner end to the adjacent end of the center segment for rearward rotation, and telescopic lengthening means included in the shorter end segment of said lower end segments for extending its length equal that of the other of said lower end segments and a plurality of equally spaced planter units carried on said center and said upper end segments of said support beam means, whereby said upper end segments may be pivoted rearwardly relative to said center segment and said lower end segments may be pivoted rearwardly relative to said center segment, said shorter lower end segment being extended, so as to bring said upper end segments into contact with each other thereby forming a quadrilateral framework structure, the lengths of said segments being designed and arranged so as to offset the spacing of said planter units carried by said end segments by about one half of the spacing of said planter units carried by said center segment when said quadrilateral structure is formed, and connection means for rigidly connecting said upper end segments together.

* * * * *